June 30, 1964 T. WEBER, JR 3,139,240

WINDING APPARATUS FOR AN ENDLESS WEB

Filed June 26, 1962 3 Sheets-Sheet 1

INVENTOR.
THEODORE WEBER, JR.
BY Joseph Montgomery
ATTORNEY.

WINDING APPARATUS FOR AN ENDLESS WEB
Filed June 26, 1962 3 Sheets-Sheet 2
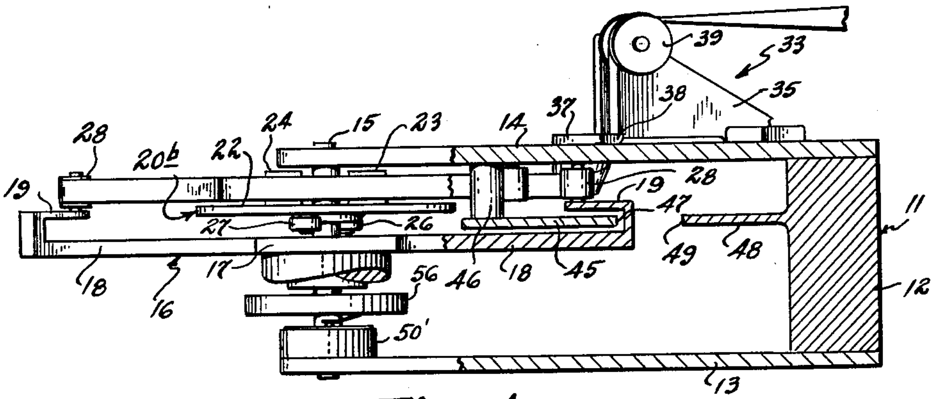
Fig. 4.
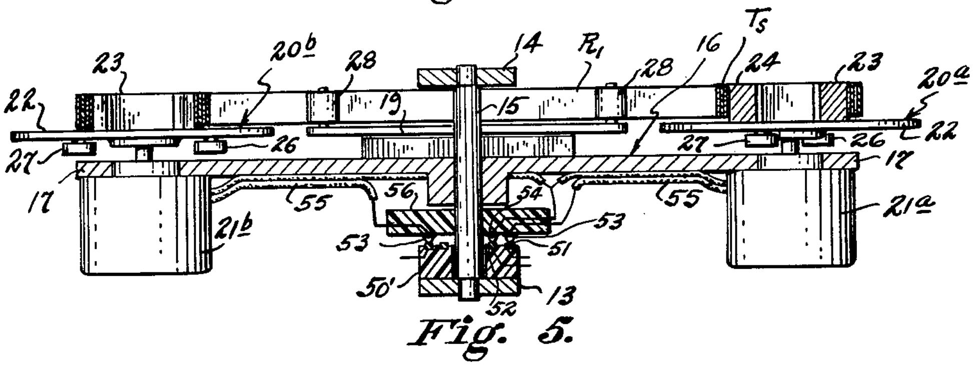
Fig. 5.
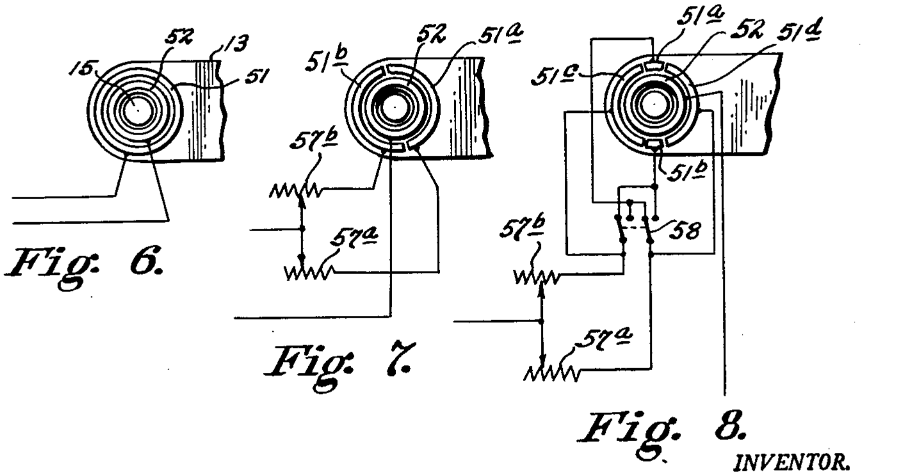
Fig. 6. Fig. 7.
Fig. 8.
INVENTOR.
THEODORE WEBER, JR.
BY
[signature]
ATTORNEY.

WINDING APPARATUS FOR AN ENDLESS WEB

Filed June 26, 1962 3 Sheets-Sheet 3

INVENTOR.
THEODORE WEBER, JR.
BY
[signature]
ATTORNEY.

United States Patent Office 3,139,240
Patented June 30, 1964

3,139,240

WINDING APPARATUS FOR AN ENDLESS WEB

Theodore Weber, Jr., Nyack, N.Y., assignor to Howard Holmes, Inc., Elmsford, N.Y., a corporation of New York Filed June 26, 1962, Ser. No. 205,249
9 Claims. (Cl. 242—55.16)

This invention relates generally to a magazine for an endless tape or film which is fed repeatedly through an external device, for example, a tape reader or sensing device, a motion picture projector or the like.

In some existing magazines for endless tapes or films, a rack is provided with widely spaced apart upper and lower rows of pulleys, and the endless tape or film passes successively around pulleys in the upper and lower rows. In such an arrangement, the sum of the lengths of tape or film extending between the successive pulleys must be equivalent to the total length of the tape or film which is to be handled. In the case of a long endless tape or film, it is apparent that the described existing magazine must occupy a relatively large space and include a relatively large number of pulleys and other structural elements for defining the long path of travel of the endless tape or film. Further, since the endless tape or film is engaged with a relatively large number of pulleys defining its extended path of travel, loading and unloading of the magazine is inconvenient and time consuming.

In another existing magazine, the endless tape or film is stored in the form of a coil on a device which permits the continuous removal of tape or film from the innermost turn of the coil and the return of the tape or film to the outermost turn of the coil. Although this arrangement is compact, it has the following serious disadvantages. The magazine is irreversible, in that it locks if an attempt is made to remove tape or film from the outermost turn of the coil for return to the innermost turn of the coil. Since the length of the innermost turn removed from the coil is substantially less than the outer circumference of the coil to which the tape or film is returned, there is relative sliding of the successive turns of the coil, and this results in rapid deterioration of endless motion picture films due to scratching thereof. Still another disadvantage of this arrangement is the necessity of rewinding the endless tape or film on a spool or reel if it is to be adequately protected during storage. If the endless tape or film is not rewound on a spool during storage, some means must be provided to protect the loop of the tape or film extending between the inner and outer turns of the coil and, since the latter has an axial height substantially greater than the width of the tape or film, compact storage of the latter is sacrificed.

Accordingly, it is an object of the invention to avoid the above mentioned disadvantages of the existing magazines for handling endless tapes or films.

More specifically, it is an object of the invention to provide a magazine for endless tapes or films which is relatively compact, easily loaded and unloaded, avoids sliding contact between portions of the tape or film and utilizes the latter in a condition for convenient storage thereof.

A further object is to provide a magazine for endless tapes or films which is operative to maintain the latter under a suitable tension and thereby ensure the compact rewinding of the tape or film.

Still another object is to provide a magazine of the described character which imposes a minimum load on the external device through which the endless tape or film is fed, and which further permits the continuous and repetitious feeding of the endless tape or film through such external device without interruption in the feeding movement.

In accordance with an important aspect of this invention, a magazine for feeding an endless tape or film to an external device generally comprises a rotatable turret carrying a pair of spools at diametrically opposed locations and which are yieldably urged to rotate in the same direction about axes parallel to the axis of rotation of the turret. The endless tape or film is wound, in a double layer, on one of the spools, while the free loop of the endless tape or film is engaged with the other spool so that, upon rotation of the latter, two layers of the tape or film are simultaneously unwound from the supply spool and rewound on the other or take-up spool, with the two layers of tape or film being guided along separated paths between the supply and take-up spools. One of the paths for the tape or film between the two spools includes exit and reentry devices at which the tape or film is respectively drawn out of the path extending from the supply spool for feeding to the external device and thereafter returned to the path extending to the take-up spool.

Upon exhaustion of the tape or film on the supply spool, the continued pulling of the tape through the external device causes rotation of the turret through 180° so that the supply and take-up spools exchange their original positions and feeding of the tape or film continues uninterruptedly with the tape or film being drawn from the former take-up spool, which then functions as the supply spool, and being returned to the former supply spool, which then functions as the take-up spool.

In accordance with another aspect of the invention, the two spools carried by the rotatable turret are urged to rotate in the same direction by torque motors so that the spool functioning as the take-up spool is driven by the associated torque motor to ensure rewinding of the two layers of tape or film thereon, while the torque motor associated with the other or supply spool yieldably resists unwinding of the tape or film therefrom, and thereby maintains a desired tension in the tape or film extending along the paths between the two spools.

In a preferred embodiment of the invention, the voltages supplied to the torque motors associated with the two spools are automatically controlled so that the torque motor associated with the spool acting as a take-up spool, at any particular time, exerts a relatively large torque on such spool, whereas the motor resisting unwinding of the tape from the other spool acting as a supply spool then exerts a relatively smaller torque, thereby to minimize the load on the external device which acts to draw the tape or film from the supply spool and thereafter to return the used tape or film to the take-up spool.

The above, and other objects, features and advantages of the invention, will be apparent in the following detailed description of illustrative embodiments thereof which is to be read in connection with the accompanying drawings forming a part hereof, and wherein:

FIG. 4 is a sectional view taken along the line 4—4 on FIG. 1;

FIG. 5 is a sectional view taken along the line 5—5 on FIG. 1;

Figures 1, 2, 3:
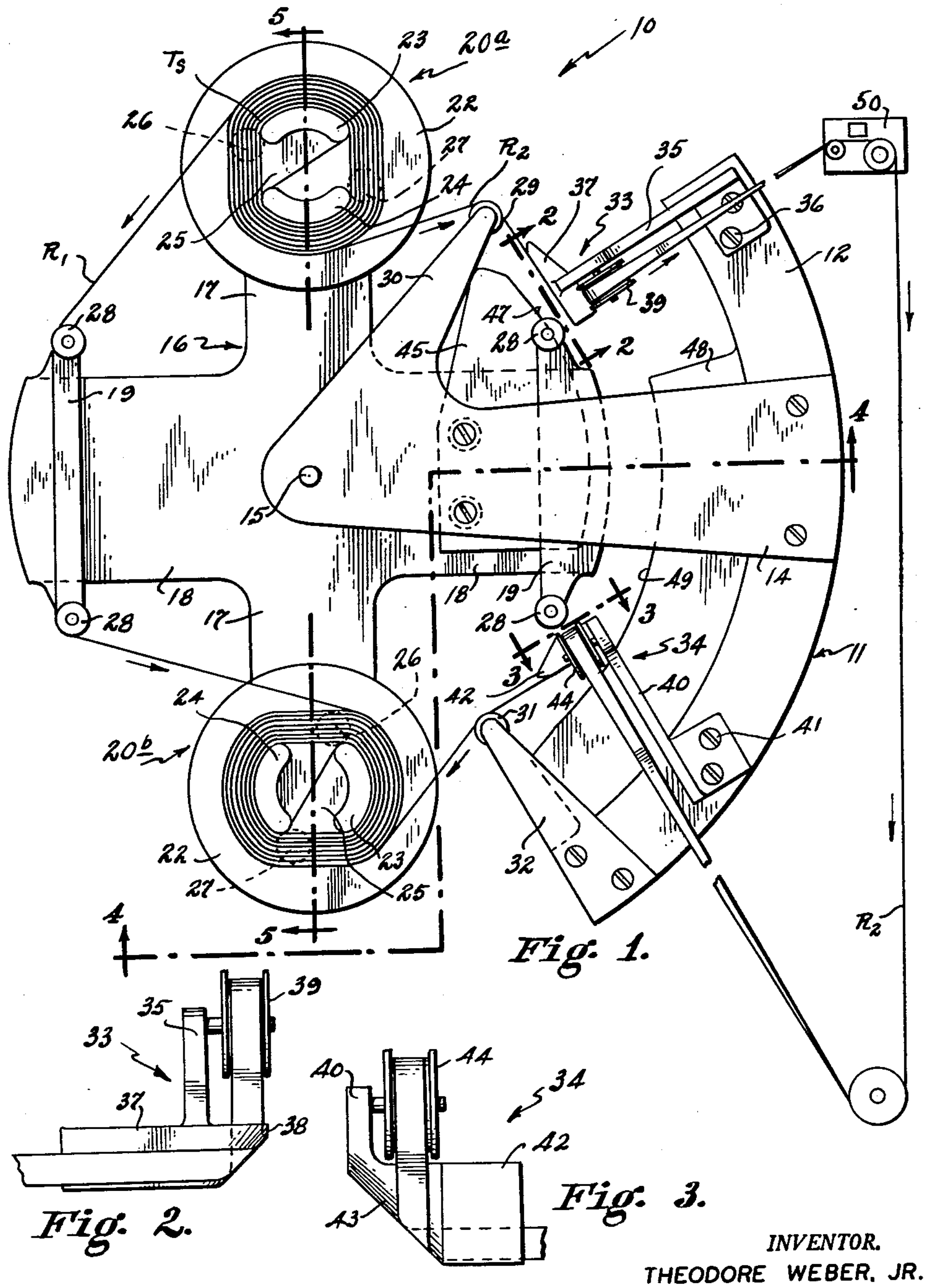
FIG. 1 is a side elevational view of a magazine for an endless tape or film which is constructed in accordance with an embodiment of the present invention.
FIG. 2 is an enlarged detail view taken along the line 2—2 on FIG. 1.
FIG. 3 is an enlarged detail view taken along the line 3—3 on FIG. 1.
Figure 9:
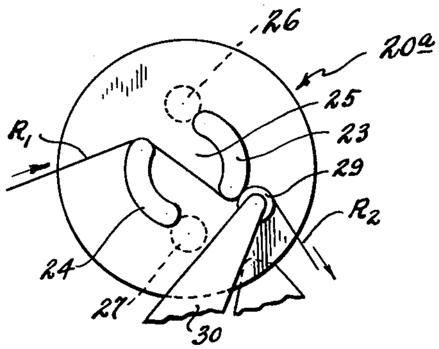

FIGS. 6, 7 and 8 are diagrammatic views illustrating several different arrangements by which current is supplied to the torque motors connected with the two spools included in the magazine embodying this invention; and FIGS. 9, 10, 11, 12, 13 and 14 are fragmentary views illustrating successive stages of the operation of the magazine of FIGS. 1, 4 and 5 during the transfer or exchange of the positions of the two spools.

Referring to the drawings in detail, and initially to FIGS. 1, 4 and 5 thereof, it will be seen that a magazine for an endless tape or film constructed in accordance with the present invention, and there generally identified by the reference numeral 10, comprises a suitably supported fixed frame 11 including an arcuate member 12 having two parallel, spaced apart arms 13 and 14 extending from the opposite sides thereof toward the center of the radius of curvature of member 12. An axle 15 is supported by the free end portions of arms 13 and 14 and carries a freely rotatable turret 16 which is adapted to pass between arms 13 and 14 during turning about the axle 15.

The turret 16 includes a pair of diametrically opposed arms 17 and, at right angles to the arms 17, a second pair of diametrically opposed arms 18 having bent back end edge portions 19 (FIGS. 1 and 4). Spools 20*a* and 20*b* are rotatably carried by the end portions of the diametrically opposed arms 17 at the side of turret 16 facing toward arm 14 of frame 11, and are arranged with their axes of rotation extending parallel to the axle 15, that is, the axis of rotation of the turret.

As shown particularly on FIG. 5, the spools 20*a* and 20*b* are respectively carried by the output shafts of torque motors 21*a* and 21*b*, respectively, which motors are suitably secured to the respective arms 17 of the turret at the side of the latter facing toward arm 13 of the frame.

The spools 20*a* and 20*b* are identical and each includes a disk 22 securely mounted, at its center, on the shaft of the related torque motor, and a hub made up of a pair of arcuate segments 23 and 24 projecting axially from disk 22 at the side of the latter facing away from turret 16, and being spaced apart so as to define a diametrically opening passage or space 25 between the segments 23 and 24.

Each spool further includes a pair of cam follower rollers 26 and 27 rotatably carried by disk 22 at the side of the latter facing toward turret 16 and being located approximately in axial alignment with the opposite ends of hub segments 23 and 24, respectively, as is apparent in FIG. 1.

The turned back end edge portions 19 of arms 18 of the turret each carry a pair of rotatable tape or film guide rollers 28 which are spaced a substantial distance from the axis of rotation of the turret. A guide roller 29 rotatable about a fixed axis is carried by an extension 30 of frame arm 14, which extension projects generally upwardly from the inner end of arm 14 and subtends an acute angle with the latter. An additional guide roller 31 rotatable about a fixed axis is carried by an arm 32 extending radially inward toward the axis of rotation of turret 16 from the arcuate frame member 12 below frame arm 14. The fixed guide rollers 29 and 31 are approximately equally spaced above and below the center line of frame arm 14 and further are equally spaced from the axis of rotation 15 by a radial distance approximately equal to the radial distances between the axes of rotation of spools 20*a* and 20*b* and the axis of rotation of the turret. Further, the radial distance of each of the fixed guide rollers 29 and 31 from the axis of rotation of the turret is greater than the radial spacing of the guide rollers 28 from the axis of the turret so that during rotation of the latter, as hereinafter described in detail, guide rollers 28 which move with the turret can pass radially inward with respect to the fixed guide rollers 29 and 31.

Tape or film exit and reentry devices 33 and 34, respectively, are fixedly mounted at locations between the upper fixed guide roller 29 and frame arm 14 and between the latter and fixed guide roller 31, respectively. As shown in FIGS. 1 and 2, the exit device 33 includes a bracket 35 secured, as at 36, to the upper end of arcuate frame member 12 and extending generally radially from the latter in the direction toward the axis of rotation of turret 16. The inner end of bracket 35 carries an exit guide 37 which is formed with an oblique or angled round end 38 (FIG. 2) so that tape or film being drawn over the fixed guide roller 29 and running around the oblique rounded end 38 of exit guide 37 is turned through an angle of 90°, so as to be led out of the plane of rotation of the spools 20*a* and 20*b* with the turret 16. The exit device 33 further includes a guide pulley 39 rotatably carried by the bracket 35 outside the plane of rotation of the spools with the turret, as is apparent in FIG. 4, and being engaged by the tape or film after the latter has traveled around the rounded end 38 of exit guide 37.

The reentry device 34 is generally similar to the above described exit device 33 and thus includes a bracket 40 (FIGS. 1 and 3) secured, as at 41, to the lower end portion of arcuate frame member 12 and extending inwardly from the latter. A reentry guide 42 is carried by the inner end of bracket 40 and has an oblique or angled round end 43. The inner end portion of bracket 40 further carries a rotatable guide pulley 44 so that the tape or film being returned to magazine 10 along a path which is spaced laterally from the plane of rotation of spools 20*a* and 20*b* with turret 16 travels around guide pulley 44 and then around the oblique rounded end 43 of reentry guide 42 which turns the tape or film through 90° prior to engagement with the fixed guide roller 31.

The exit and reentry guides 37 and 42, which both extend into the plane of rotation of the spools with the turret, are dimensioned and positioned radially with respect to the axis of rotation of the turret so that, during turning of the turret as hereinafter described in detail, the hub segments 23 and 24 of a spool being transferred from the upper position occupied by the spool 20*a* on FIG. 1 to the lower position occupied by the spool 20*b* can pass radially inside and outside, respectively, of the exit and reentry guides 37 and 42.

In order to hold each spool against rotation during its transfer from the upper position to the lower position of FIG. 1 by turning of turret 16, the magazine 10 further includes a fixed cam 45 (FIGS. 1 and 4) supported through spacers 46 from frame arm 14 so as to lie in the plane of rotation of the cam follower rollers 26 and 27 of the spools with the turret. The fixed cam 45 has an outer arcuate edge 47 formed with a small radial rise at its initial portion and being concentric with the axis of rotation of turret 16 through the remainder of its length. A second fixed cam 48 extends radially inward from arcuate frame member 12 in the same plane as fixed cam 45 and has an inner arcuate edge 49 which is concentric with the major portion of the length of cam edge 47 and spaced radially outward from the latter.

In loading the magazine 10 embodying this invention, the endless tape or film in the form of a continuous belt of very substantial length is looped around one of the hub segments 23 or 24 of one of the spools which is thereafter rotated in the clockwise direction, as viewed in FIG. 1, so that the tape or film is wound on the spool in double layers. Such spool having the endless tape or film wound thereon, as at $T_s$ (FIG. 1) becomes the supply spool and is placed at the upper position on the turret occupied by the spool 20*a* on FIG. 1. The free loop of the tape or film wound on supply spool 20*a* is engaged around one of the hub segments 23 or 24 of the other spool 20*b* occupying the lower or take-up spool position on the turret. Since the tape or film is unwound in two layers from the supply $T_s$ on spool 20*a* the outer and inner unwound layers form two runs $R_1$ and $R_2$ extending between spools 20*a* and 20*b*. The run $R_1$ formed by the outer layer of tape or film unwound from supply spool 20*a* is passed over the guide rollers 28 of the turret at the side of the axis of rotation of the latter extending away from the support frame 11 and becomes the inner layer of the two layers of tape which are simultaneously rewound or taken up on the take-up spool 20*b* during rotation of the latter in the clockwise direction, as viewed on FIG. 1. The other run $R_2$ of the tape or film represented by the inner layer unwound from spool 20*a* passes successively over fixed guide roller 29, through exit device 33 and then through an external device or machine indicated schematically at 50 on FIG. 1 and which may be a tape reader or senser, a motion picture projector or the like including a conventional feeding mechanism (not shown), for example, in the form of suitably driven feed rollers or sprockets, for positively effecting the movement of the tape or film therethrough. After passing through the external device 50, the run $R_2$ of the endless tape or film passes through reentry device 34 and over fixed guide roller 31 prior to being rewound, as the outer one of the double layers on take-up spool 20*b*.

In the magazine 10 embodying this invention both of the torque motors 21*a* and 21*b* are energized to urge the related spools 20*a* and 20*b* to rotate in the same direction, for example, in the clockwise direction as viewed on FIG. 1. Thus, the torque motor 21*b* effects clockwise rotation of the spool 20*b* in the lower take-up position, thereby to rewind both runs $R_1$ and $R_2$ of the tape or film as such runs are respectively received from the spool 20*a* in the upper or supply position and returned to the magazine from the external device or machine 50. On the other hand, the torque motor 21*a* yieldably resists the unwinding or counterclockwise rotation of the spool 20*a* and thereby maintains a desired tension in both runs $R_1$ and $R_2$ for positively avoiding tangling of the tape or film, particularly as the latter is fed from the magazine, through the external machine 50 and then returned to the magazine, and further for ensuring that the double layers of tape or film are tightly rewound on the spool 20*b* in the take-up position. Since the torque applied to the spool 20*b* in the take-up position for rewinding the tape or film thereon is more or less opposed by the torque applied to the other spool 20*a* for resisting the unwinding of the tape or film therefrom, it will be apparent that the actual unwinding of the tape from the spool 20*a* is at the speed of, and caused by the feeding movement of the tape or film through the external device 50. Further, since the tensions in both runs $R_1$ and $R_2$ are substantially equal so long as tape or film remains in the supply $T_s$ wound on spool 20*a* in the upper or supplying position, the forces acting on turret 16 are substantially balanced about its axis of rotation so that the turret remains in the position illustrated on FIG. 1.

Figure 10:
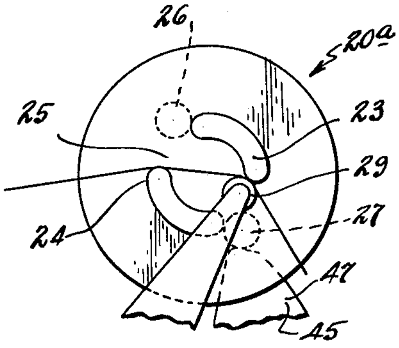
Figures 11, 12:
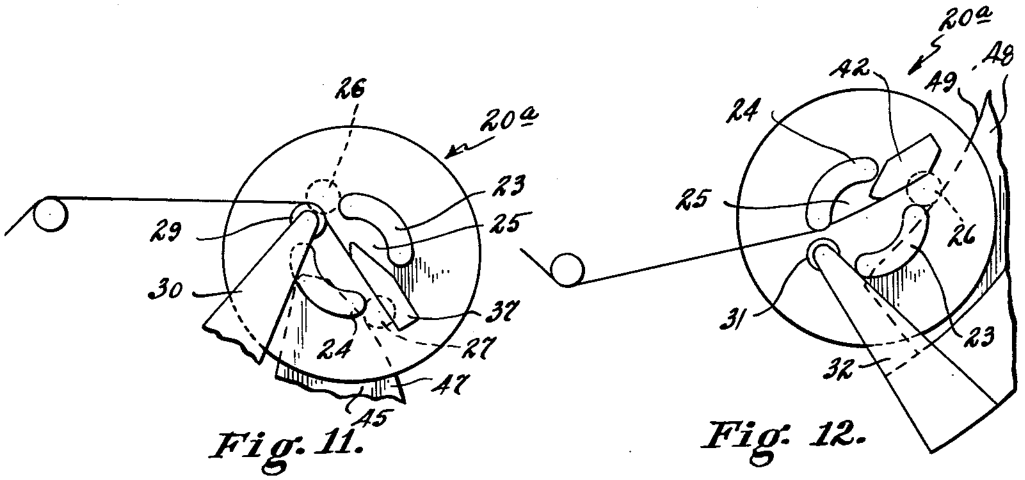

The operation of the above described magazine 10 in exchanging the positions of the spools 20*a* and 20*b* when the supply of tape or film on the spool in the upper or supplying position has become exhausted, will now be described with reference to FIGS. 9 to 14, inclusive. When the supply of tape or film on the upper spool 20*a* has become exhausted, as in FIG. 9, so that the continued feeding of tape or film through the external machine 50 can no longer be accompanied by unwinding of tape from spool 20*a* for movement along both runs $R_1$ and $R_2$ toward the take-up spool 20*b* in the lower position, the feeding movement of the tape or film exerts a pull on the run $R_1$ thereof in the direction away from the lower spool 20*b* and, since unwinding of tape from the spool 20*b* is resisted by the torque applied to the latter through the related motor 21*b*, a turning moment or couple is developed to effect rotation of turret 16 on axle 15 in the clockwise direction, as viewed in FIG. 1. During initial turning movement of turret 16, the leading edge of hub segment 23 of spool 20*a* rides over fixed guide roller 29 so that the latter enters the diametrically opening space 25 defined between both hub segments 23 and 24, as shown in FIG. 10. As fixed guide roller 29 enters the space 25 between the hub segments of spool 20*a*, cam follower roller 27 of that spool contacts the edge 47 of fixed cam 45 and is held against the latter by the clockwise torque applied to spool 20*a* through the related torque motor 21*a*. Cam 45 is dimensioned so that, when cam follower roller 27 is held in engagement with cam edge 47, as described above, the diametrical center line of the space 25 between hub segments 23 and 24 is substantially tangential with respect to the circular path of travel followed by the center of spool 20*a* during turning of turret 16. Upon further turning of turret 16, spool 20*a* moves from the position shown in FIG. 10 to that of FIG. 11 where the exit guide 37 is shown passing freely through the space or passage 25 of the spool held against rotation in the above described position. Further turning of turret 16 brings the cam follower roller 26 of spool 20*a* into engagement with the edge 49 of fixed cam 48 and the torque exerted on the spool 20*a* serves to maintain such engagement. Cam 48 is dimensioned so that the engagement of cam follower roll 26 with cam edge 49 continues to hold the spool 20*a* against rotation in the position where the diametrical medial line of the space 25 is tangential to the circular path of travel followed by the center of the spool. Thus, as spool 20*a* passes reentry device 34, as shown in FIG. 12, the reentry guide 42 is received in space 25 and the hub segments 23 and 24 pass at the radially outer and inner sides, respectively, of guide 42.

Figure 13:
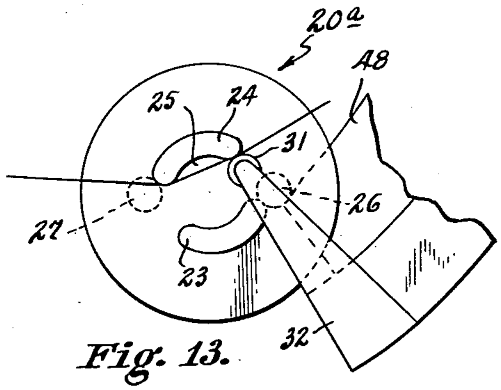
Figure 14:
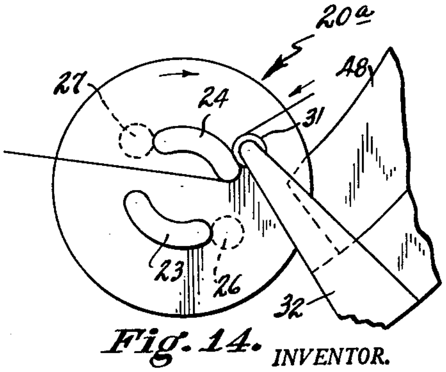

As spool 20*a* nears the lower or take-up position formerly occupied by the spool 20*b*, the space 25 between hub segments 23 and 24 accommodates fixed guide roller 31 and, as the hub segments move away from roller 31, the trailing end edge of hub segment 24 rides on fixed guide roller 31 while cam follower roller 26 begins to ride off fixed cam 48 (FIG. 13). As spool 20*a* nears the lower or take-up position, as shown in FIG. 14, hub segment 24 rides off fixed guide roller 31, and cam follower roller 26 is clear of cam 48 so that the torque motor 21*a* associated with spool 20*a* can then effect clockwise rotation of spool 20*a* to commence the rewinding of double layers of the tape or film on the spool 20*a* in the lower take-up position.

It will be understood that, as the spool 20*a* is moved from the upper or supply position to the lower or take-up position, in the manner described above, the other spool 20*b* has been moved from the lower or take-up position to the supply position previously occupied by the spool 20*a*. Thus, when spool 20*a* reaches the lower or take-up position and is there rotated in the clockwise direction for effecting the rewinding of the tape or film thereon, the other spool 20*b* carrying substantially the full supply of tape or film, and simultaneously reaching the upper or supply position is turned in the counterclockwise direction, against the yieldable force exerted by its associated torque motor 21*b*, so as to permit the unwinding of the tape from spool 20*b* and the simultaneous movement of the tape along both paths $R_1$ and $R_2$ to the take-up spool.

As shown in FIGS. 5 and 6, the current for energizing torque motors 21*a* and 21*b* may be supplied to the latter through an electric circuit connected to continuous commutators 51 and 52 carried by an insulating block 50′ mounted on frame arm 13 around shaft or axle 15 and being slidably engaged by brushes 53 and 54 mounted on a brush holder 56 turning with turret 16 on axle 15 and being connected through suitable leads 55 with motors 21*a* and 21*b*. If both slip rings 51 and 52 are continuous, as in FIG. 6, then both torque motors 21*a* and 21*b* have the same voltages impressed thereon, and apply equal torques to the related spools in all positions of the latter. However, as shown in FIG. 7, the slip ring 51 may be replaced by a commutator having two separate segments 51*a* and 51*b*. The brush 54 engaging the continuous slip ring 52 is connected to a lead of both of the torque motors 21*a* and 21*b*, while the other leads of the motors 21*a* and 21*b* are connected to individual brushes 53 at diametrically opposed locations on brush holder 56. The commutator segments 51*a* and 51*b* are connected to a suitable source of current through resistors 57*a* and 57*b*, respectively. When resistors 57*a* and 57*b* have different values, it will be apparent that the two motors 21*a* and 21*b* will have different voltages impressed thereon by reason of the contact of the associated brushes 53 with the two different segments of the commutator. The segments 51*a* and 51*b* are located, and the values of the resistors 57*a* and 57*b* are selected so that, when a spool is in the upper or supply position, its related torque motor will have a relatively small voltage impressed thereon, thereby reducing the torque applied for resisting unwinding of the tape from such spool and minimizing the load on the external machine 50, whereas the torque motor associated with the spool in the lower or take-up position will continue to apply a relatively high torque for ensuring adequate tension in the tape or film and smooth rewinding thereof.

Although the operation of the magazine 10 embodying this invention has been described with the tape or film being fed from the upper spool and rewound on the lower spool, it is to be understood that the direction of the tape movement may be reversed, that is, from the lower spool to the upper spool and that, in such case, exhaustion of the supply of tape or film on the lower spool will result in counterclockwise turning of the turret 16, as viewed in FIG. 1, to transfer the empty spool from the lower position to the upper position. During such transfer of the empty spool, the cooperation thereof with the fixed guide rollers 31 and 29 and with the fixed cams 48 and 45 will be substantially the same as previously described herein, but in the reverse order.

When the magazine 10 is to be used for feeding in either direction, the circuit for energizing the torque motors 21*a* and 21*b* may be in the form illustrated on FIG. 8. In this arrangement, the commutator includes four segments 51*a*, 51*b*, 51*c* and 51*d*. The segments 51*a* and 51*b* are engaged by the brushes 53 only when the spools associated with the related torque motors are at the upper and lower positions, while the commutator segments 51*c* and 51*d* are engaged by the brushes 53 during transfer of the spools between the upper and lower positions. A two-position switch 58 is connected in the circuit so that, in one position of switch 58, segments 51*b* and 51*c* are connected with resistor 57*b* and segments 51*a* and 51*d* are connected with resistor 57*a*, while in the other position of the switch, segments 51*a* and 51*c* are connected with resistor 57*b* and segments 51*b* and 51*d* are connected with resistor 57*a*. Thus, when the turret is stationary, the torque motors associated with the upper and lower spools receive current through one or the other of the resistors 57*a* and 57*b*, depending upon the position of the reversing switch 58. The switch is set according to the direction in which the tape is to be used by the external machine 50. Thus, if the tape is fed downwardly, that is, from the upper spool to the lower spool, as assumed in the description of the device in FIG. 1, then the switch is positioned to provide a high torque on the lower spool and a smaller torque on the upper spool. On the other hand, if the position of the switch is reversed and the tape or film is fed from the lower spool to the upper spool, then the upper spool has the full torque imposed thereon, and a smaller torque is imposed on the lower spool. The connections of the commutator segments 51*c* and 51*d*, as described above, ensure that, during movement of the turret, the full torque will be imposed on the spool carrying the supply of tape or film, while the other or empty spool will have a small torque imposed thereon to minimize friction and cam reaction in the rises at the ends of the cams 45 and 48 and in general to provide smoothness of operation.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. A magazine for an endless tape or film in the form of a belt to be fed repeatedly in one direction through an external device, comprising a turnable turret carrying a pair of spools at diametrically opposed locations thereon and being exchangeable between supplying and take-up positions by turning of said turret, each of said spools being mounted for rotation about an axis parallel to the turning axis of the turret and including a pair of spaced apart hub segments around which the belt can be looped preparatory to the winding of the belt on the spool in two layers, means yieldably urging both of said spools simultaneously to rotate on said turret in the direction for winding the belt thereon, and guide means on the turret spaced from said turning axis of the latter by distances less than the distances between the axes of rotation of the spools and said turning axis and being adapted to guide one run of said belt between said two spools; exit and reentry devices fixedly mounted adjacent the circular path of travel of said spools with said turret and being operative on the other run of the belt between said spools to lead the belt to an external device from said magazine and to return the belt to the latter from the external device, said exit and reentry devices having guides extending from the plane of rotation of the spools with the turret at radial distances from said turning axis of the turret equal to said distances between said axes of rotation of the spools and said turning axis; and means operative during turning of said turret to hold the spool moving from said supplying position to said take-up position against rotation in a position where said hub segments pass radially inside and outside of said guides of the exit and reentry devices.

2. A magazine as in claim 1; wherein said means yieldably urging both of said spools simultaneously to rotate includes a torque motor connected with each of said spools, the torque motor associated with the spool in said take-up position causing rewinding of the belt thereon, and the torque motor associated with the spool in said supplying position yieldably resisting unwinding of the belt therefrom so as to maintain tension in both of said runs.

3. A magazine as in claim 2; further comprising circuit means for energizing said torque motors, said circuit means including branches having resistors of different values therein for supplying correspondingly different voltages, and means operable in response to turning of said turret to connect the torque motor associated with the spool at said supplying position with the branch supplying a relatively low voltage, while the torque motor associated with the spool at said take-up position is connected with the other of said branches, whereby the spools at said supplying and take-up positions are subjected to relatively small and large torques to avoid the imposition of an excessive load on the external device.

4. A magazine as in claim 3; wherein said circuit means further includes reversing switch means for reversing the locations of said supplying and take-up positions at which the relatively small and large torques are imposed on the spools, thereby to adapt the magazine for selectively changing the direction of feeding movement of the belt through the external device.

5. A magazine as in claim 1; wherein said means operative to hold the spool moving from the supplying position to the take-up position against rotation includes fixed cam means disposed adjacent said circular path of travel of the spools, and cam follower means on each of said spools urged against said cam means by said means urging the spool to rotate during movement of the related spool from said supplying position to said take-up position.

6. A magazine as in claim 1; wherein said guide of each of said exit and reentry devices is adapted to fit between said hub segments of each spool during movement of the latter from said supplying position to said take-up position further has an oblique, rounded surface for engagement with the belt to turn the latter through ninety degrees between a path lying in the plane of rotation of said spools with the turret and a path extending at right angles with respect to said plane of rotation.

7. A magazine as in claim 1; further comprising fixed guide rollers located adjacent said circular path of travel between the locations of said exit and reentry devices and said supplying and take-up positions of the spools, respectively, and being radially spaced from said turning axis so as to fit between said hub segments of each spool during movement of the latter from said supplying position to said take-up position.

8. A magazine as in claim 7; wherein said guide means on the turret includes guide rollers spaced at opposite sides of the diametrical line extending between said spools and being radially spaced from said turning axis by distances less than the radial spacing of said fixed guide rollers from the turning axis so as to clear said fixed guide rollers during turning of the turret.

9. A magazine as in claim 1; wherein said means yieldably urging both of said spools simultaneously to rotate in the direction for winding the belt thereon includes control means causing relatively large and small torques to be exerted on the spools at said supplying and take-up positions, respectively.

References Cited in the file of this patent

UNITED STATES PATENTS

| | | |
|---|---|---|
| 1,199,536 | Fredericks | Sept. 26, 1916 |
| 1,624,580 | Burnett | Apr. 12, 1927 |
| 1,979,354 | Tenny | Nov. 6, 1934 |
| 1,979,355 | Tenny | Nov. 6, 1934 |
| 2,412,551 | Pratt et al. | Dec. 10, 1946 |
| 2,657,870 | Pettus | Nov. 3, 1953 |
| 2,807,191 | Flora | Sept. 24, 1957 |
| 3,045,937 | Johnson | July 24, 1962 |

FOREIGN PATENTS

| | | |
|---|---|---|
| 600,986 | France | Nov. 21, 1925 |